United States Patent [19]
Bateman

[11] 3,947,809
[45] Mar. 30, 1976

[54] BELOW GLIDE SLOPE ADVISORY WARNING SYSTEM FOR AIRCRAFT

[75] Inventor: Charles Donald Bateman, Bellevue, Wash.

[73] Assignee: Sundstrand Data Control, Inc., Redmond, Wash.

[22] Filed: Jan. 22, 1975

[21] Appl. No.: 540,476

[52] U.S. Cl....... 340/27 AT; 73/178 T; 235/150.22; 244/77 A; 343/7 TA; 343/108 R; 343/112 CA
[51] Int. Cl.².......................................... G01C 5/00
[58] Field of Search ............. 73/178 R, 178 T, 179; 179/15 A; 235/150.2, 150.22; 244/77 A, 77 D; 340/16 R, 16 M, 16 C, 27 AU, 29, 52 H, 56, 62, 66, 74, 258; 343/5 LS, 7 R, 7 TA, 7 ED, 7 PF, 7.7, 8, 9, 12 R, 12 A, 108 R, 112 A, 112 CA, 112 S

[56] References Cited
UNITED STATES PATENTS

| | | | |
|---|---|---|---|
| 2,735,081 | 2/1956 | Hosford | 340/27 AT |
| 3,052,427 | 9/1962 | Match et al. | 244/77 A |
| 3,291,421 | 12/1966 | Kramer et al. | 244/77 A |
| 3,323,124 | 5/1967 | Handberg | 343/108 R |
| 3,355,733 | 11/1967 | Mitchell et al. | 343/108 R X |
| 3,381,295 | 4/1968 | Blackledge | 343/108 R |
| 3,489,378 | 1/1970 | Watson et al. | 244/77 A |
| 3,652,835 | 3/1972 | Devlin et al. | 235/150.22 |
| 3,658,280 | 4/1972 | McDonnell | 244/77 D |
| 3,743,221 | 7/1973 | Lykken et al. | 244/77 A |
| 3,757,338 | 9/1973 | Liebman | 343/108 R |
| 3,801,049 | 4/1974 | Simpson et al. | 244/77 A |
| 3,892,373 | 7/1975 | Doniger | 244/77 A |

Primary Examiner—Trygve M. Blix
Assistant Examiner—Stephen G. Kunin
Attorney, Agent, or Firm—Wegner, Stellman, McCord, Wiles & Wood

[57] ABSTRACT

For use in an aircraft warning system which measures the descent below a radio glideslope and compares it with the aircraft's altitude above ground to generate a warning when the descent below glideslope exceeds predefined limits for a particular altitude, circuitry is provided to generate an advisory warning above a predefined altitude and a hard warning, or command to take immediate action, below the predetermined altitude.

26 Claims, 2 Drawing Figures

BELOW GLIDE SLOPE ADVISORY WARNING SYSTEM FOR AIRCRAFT

CROSS REFERENCE

This application is a modification of my copending application Ser. No. 480,727 filed June 19, 1974, entitled "Aircraft Ground Proximity Warning Instruments" and assigned to the same assignee as the instant application.

BACKGROUND OF THE INVENTION

The invention relates to aircraft ground proximity warning systems and in particular to warning systems utilizing a glide slope radio beam wherein a warning is generated when the aircraft's descent below glide slope exceeds a predetermined value for a particular altitude.

In the prior art, specifically the U.S. Pat. application of Bateman Ser. No. 480,727, entitled "Aircraft Ground Proximity Warning Instrument," filed on June 19, 1974 and assigned to the assignee of this application, a warning is generated whenever the aircraft is not in a safe zone of operation below a predefined altitude such as 650 feet above ground level. This safe zone of operation, or the distance below the glide slope, will vary depending upon the aircraft's altitude above ground. For example, between 650 feet and 150 feet above ground the aircraft must stay within a predefined angular distance, measured in dots, of the glide slope or a warning signal will be triggered. This feature allows the pilot to adjust the absolute altitude of the aircraft with somewhat greater latitude at greater altitudes where such maneuvers are inherently safer.

However, there are certain conditions under which the crew of an aircraft may wish to descend below the glide slope sufficiently to trigger the warning where such a descent would be in conformity with safe operating procedures. For example, there are a number of runways where the glide slope beam is substantially displaced from the threshold toward the middle of the runway. Thus, under visual operating conditions, it is not unusual for the crew of an aircraft to make use of this additional runway which in turn necessitates descending sufficiently below the glide slope to trigger a warning. A warning triggered under these conditions, especially at higher altitudes such as 650 feet, can be considered advisory at best and as a practical matter most crew members will consider it a nuisance warning with a resultant loss in credibility of the system as a whole.

However, in a majority of cases it is still considered desirable to have the warning envelope of the same general type provided by the system in Bateman 480,727 so that the aircraft's crew may be apprised of a potentially dangerous descent under the glide slope even at these greater altitudes.

SUMMARY OF THE INVENTION

It is therefore an object of the invention to provide a glide slope warning system with an advisory only warning above a predetermined altitude and a positive or hard warning below that predetermined altitude.

It is another object of the invention to provide a system for generating an advisory warning envelope above a predetermined altitude and a hard warning envelope below the predetermined altitude.

An additional object of the invention is to provide a glide slope warning system that generates a first type of warning when the aircraft descends below a first angular limit from a glide slope above a predefined altitude and generates a second type of warning when it descends below a second angular limit below the predefined altitude.

The glide slope warning system utilizes the combination of a glide slope signal from an instrument landing system (ILS) which indicates the aircraft's angular position with respect to a glide slope radio beam and an altitude above ground signal which is most commonly derived from a radio altimeter. The polarity and amplitude of the glide slope signal indicate the aircraft's relative position with respect to the glide slope radio beam. For example, if the aircraft is below the beam the glide slope signal will be positive, indicating "fly-up" condition.

The advisory warning is generated when the combination of the glide slope signal and the altitude signal exceeds a predetermined value above a predefined altitude. Normally the advisory portion of the warning system is activated between a maximum altitude, for example, 1000 feet and the predetermined lower altitude of 300 feet. The glide slope signal and the altitude signal are scaled to represent the number of dots, representing the angular distance that the aircraft is below the glide slope beam. When the air craft is in the advisory region, between 1000 feet and 300 feet, and the aircraft is below the predefined number of dots, an advisory warning signal is triggered.

By the same token, below the advisory level, 300 feet, a command warning, for example, a command to the crew to "pull up" will be generated when the combination of the glide slope signal and the altitude signal exceeds a value that represents a predefined number of dots. The number of dots of deviation from the glide slope is increased as compared to the number of dots allowed in the advisory area.

Once the aircraft descends below a certain altitude, such as 150 feet, it is assumed that the aircraft is fairly close to the end of the runway and, hence, the source of the glide slope beam. As the aircraft approaches the source of the glide slope beam, even a minor change of actual altitude above ground will result in a fairly substantial angular change. So, in order to reduce the sensitivity of the warning system, in terms of the number of dots required to trigger a warning, as the aircraft approaches the end of the runway, the sensitivity of the system is reduced on a linear basis from 150 feet to 50 feet. Below 50 feet the system is inhibited entirely in order to prevent nuisance warnings as the aircraft approaches touchdown.

DETAILED DESCRIPTION OF THE INVENTION

Figure 1:
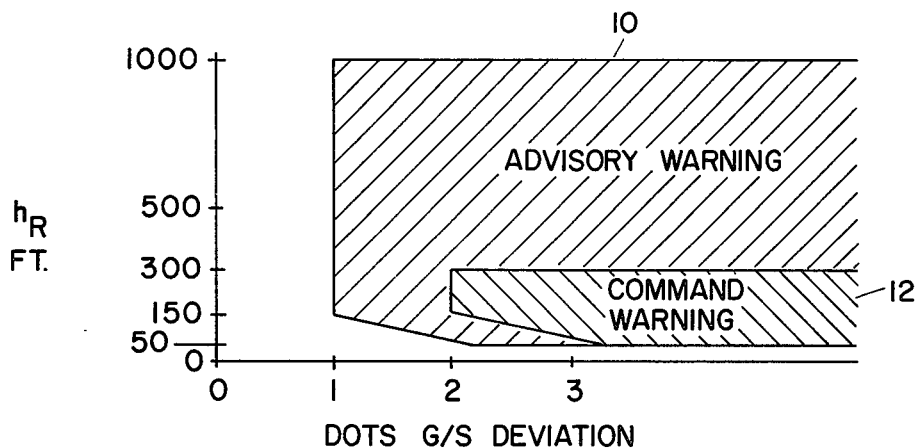
FIG. 1 is a graphical illustration of the advisory and command warning envelopes with respect to altitude and glide slope deviation.

In FIG. 1 the advisory and command warning envelopes are set forth in terms of glide slope deviation and the aircraft's altitude above ground. The horizontal axis of FIG. 1 represents the aircraft's deviation below the glide slope as represented in dots. The vertical axis of FIG. 1 represents the aircraft's altitude above ground, as preferably measured by a radio altimeter. The shaded area 10 representing the advisory portion of the envelope extends from a maximum atitude of 1000 feet to a cut off altitude of 50 feet. The command warning area represented by the shaded portion 12 of the warning envelope extends from a maximum altitude of 300 feet above ground to the cut off altitude of 50 feet. The graph in FIG. 1 illustrates that an advisory warning will be generated when the aircraft is one dot or more below the glide slope at an altitude of 150 to 1000 feet and similarly will generate the command warning when the aircraft is two dots or greater below the glide slope, anywhere from 150 to 300 feet above the ground.

Figure 2:
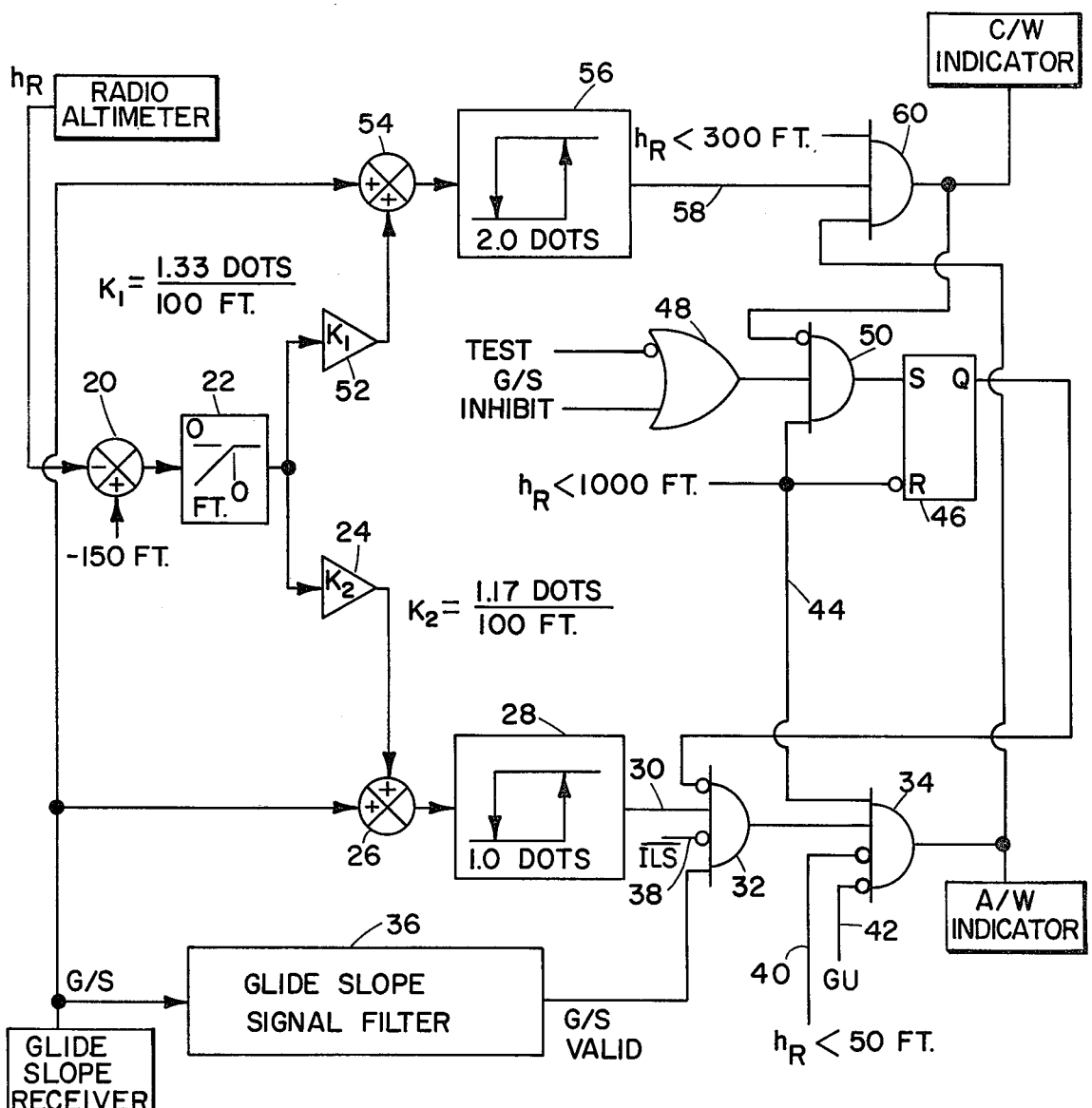
FIG. 2 is a functional block diagram of the glide slope warning system.

The preferred embodiment of the circuitry for carrying out the invention and generating warnings in conformity with the graph in FIG. 1 is set forth in FIG. 2. Both the altitude above ground signal $h_R$ and the glide slope signal G/S are generated in a manner similar to that described in the application of Bateman Ser. No. 480,727. The altitude signal $h_R$ is a direct current signal with the amplitude representing the aircraft's altitude above the ground. The altitude signal $h_R$, having a negative polarity, is an input to the negative terminal of the summing junction 20. A bias signal representing a minus 150 feet is also an input to the summing junction 20 at its positive terminal. The resulting signal is then applied to the limiter 22, which limits the output of the summing junction 20 to a maximum of zero for altitudes of 150 feet or greater.

The limited altitude signal is then utilized as an input to the scaling amplifier 24, which produces a signal proportional to 1.17 dots per 100 feet of altitude. The scaled altitude signal is utilized as an input to the summing junction 26. The other input to the summing junction 26 is the glide slope deviation signal G/S, which also has its amplitude scaled in terms of dots. The scaling of the G/S signal in terms of dots, corresponds with the typical glide slope display utilized in conjunction with standard instrument landing systems in which a pointer is associated with a field of dots. Normally, a three dot indication is provided for indicating maximum "fly up" or "fly down" conditions. This C/S signal representing the number of dots the aircraft is below the glide slope is combined with the scaled altitude signal in the summing junction 26. The detector 28 will generate a positive signal, or a logic 1, on the line 30 when the sum of these two signals is greater than 1.0 dots. When the aircraft is between 1000 feet and 50 feet above ground and a valid G/S signal is received, the positive signal on line 30 will be transmitted through the AND gates 32 and 34 to an advisory alarm system. Typically, the advisory alarm will be a flashing light indicating to the crew that the aircraft has entered the advisory warning portion of the glide slope area.

The determination as to whether the glide slope signal is valid or not is provided by the glide slope signal filter 36, which is disclosed in detail in Batemen Ser. No. 480,727. The AND gate 32 also has an input 38 which serves to inhibit the gate when the aircraft is not utilizing an ILS system. The AND gate 34 is inhibited by a signal on line 40 indicating that the aircraft's altitude is less than 50 feet above the ground and is also inhibited by a signal on line 42 indicating the aircraft's flight configuration. For example, if the landing gear of the aircraft is up, a low signal will be produced on line 42 thereby inhibiting the glide slope advisory warning. In addition, the AND gate 34 receives a positive signal on line 44 whenever the aircraft is below 1,000 feet, which has the effect of activating the advisory warning system.

The function of the flip-flop 46 is to permit both the testing and the inhibiting of the warning system. Since it is occasionally desirable to be able to inhibit the system during flight, for example, if the aircraft's crew knows that it will be making a descent sufficiently below the glide slope to trigger a warning, the inhibit circuitry of FIG. 2 has been provided. The inhibiting of the warning system in the preferred embodiment of the invention can only occur when the aircraft is below 1,000 feet above ground and is not within the command warning portion 12 of the warning envelope. Under these conditions a positive inhibit signal will be transmitted from the OR gate 48 through the AND gate 50 having the effect of setting the flip-flop 46. The resulting positive signal from the Q terminal of the flip-flop 46 will inhibit the AND gate 32 thereby preventing either an advisory warning or a command warning signal from being generated.

The command warning signal 12 of FIG. 1 is generated only when the aircraft is below 300 feet. The altitude signal $h_R$, as limited by the limiter 22, is scaled by the scaling amplifier 52 by a ratio equal to 1.33 dots per 100 feet of altitude. It should be noted here that the function of the scaling amplifier 52 can be accomplished with the scaling amplifier 24, thereby eliminating the amplifier 52. As with the advisory warning signal 10 of FIG. 1, the scaled altitude signal is combined with the G/S signal at the summing junction 54. The detector 56 generates a positive signal, or logic 1, on line 58 whenever the output of the summing junction 54 is equivalent to 2.0 dots or more. The AND gate 60 inhibits the command warning whenever the aircraft's altitude above ground is greated than 300 feet or whenever the aircraft is outside advisory warning area 10. It can therefore be appreciated that, as in conformity with the graph in FIG. 1, there will always be an advisory warning before the command warning signal is activated. The command warning alarm itself can be generated in a manner similar to the type alarm disclosed in Bateman Ser. No. 480,727.

It will be understood that the various altitudes and deviations from the glide slope, represented in dots, were provided to illustrate the preferred embodiment of the invention and are not in any way intended to limit the concepts disclosed or claimed in any manner.

I claim:

1. In a glide slope warning system for use by aircraft at airports having a glide slope radio beam, having means for generating a signal representing the deviation of the aircraft from the glide slope, and means for generating a signal representing the altitude of the aircraft above ground, improved means for generating a warning signal when the glide slope deviation exceeds predetermined limits, said improved warning signal generating means comprising:

means for generating a first warning signal, in response to the deviation signal; and means for generating a second warning signal, in response to the deviation signal, when the aircraft is below at least one predefined altitude.

2. The warning system of claim 1 wherein said first warning signal means includes:

means responsive to the deviation signal for generating a signal indicative of aircraft descent below a first predetermined distance below the glide slope; and means for inhibiting said first warning signal above a first altitude.

3. The warnings system of claim 2 wherein said first warning signal means includes means for inhibiting said first warning signal in accordance with a predefined aircraft flight configuration.

4. The warning system of claim 2 wherein said second warning signal means includes:
means responsive to the deviation signal for generating a signal indicative of aircraft descent below a second predetermined distance below the glide slope; and
means for inhibiting said second warning signal above said predefined altitude.

5. The warning system of claim 4 wherein said warning improved signal means additionally includes:
means for inhibiting both said first and said second warning signals below a minimum altitude; and
means for inhibiting said first and said second warning signals in accordance with a predefined aircraft flight configuration.

6. The warning system of claim 5 additionally including means responsive to the altitude signal for incresaing the deviation required from the glide slope to trigger said first and said second warning signals with decreasing altitude.

7. An aircraft instrument for warning of excessive descent below a radio glide slope beam, comprising:
a glide slope beam receiver for generating a deviation signal indicative of the angular displacement of the aircraft below the glide slope;
a radio altimeter for generating a radio altitude signal;
means for combining the signal indicating the displacement of the aircraft below the glide slope with the radio altitude signal to provide an altitude biased deviation signal;
a first detector connected with said combining means for generating a first excessive deviation signal when said biased deviation signal exceeds a first value;
a second detector connected with said combining means for generating a second excessive deviation signal when said biased deviation signal exceeds a second value;
first warning means, responsive to said first excessive deviation signal for generating an advisory warning below a first predefined altitude; and
second warning means, responsive to said second excessive deviation signal, for generating a command warning below a second predefined altitude.

8. The aircraft instrument of claim 7 additionally including:
filter means for determining the validity of the glide slope beam received by said glide slope receiver;
means responsive to said radio altitude signal for inhibiting said warning signals below a minimum altitude;
means responsive to said filter means for inhibiting said warning signals when an invalid glide slope beam is being received; and
means for inhibiting said warning signals when said aircraft is in a predetermined flight configuration.

9. A glide slope deviation warning system for use in aircraft having a glide slope deviation signal means and a radio altitude signal means, comprising:

a first summing means for combining the altitude signal with a bias signal representing a minimum altitude;
a scaling amplifier for converting said biased altitude signal into a signal scaled to represent a predefined ratio of units of glide slope deviation to units of altitude;
second summing means for combining the glide slope deviation signal with said scaled altitude signal;
third summing means for combining the glide slope deviation signal with said scaled altitude signal;
a first signal detector circuit operatively connected to said second summing means for generating an advisory warning signal when the output of said second summing means exceeds a first predetermined value;
a first gate circuit operatively connected to said first detector for inhibiting said advisory signal above a predetermined maximum altitude and below a predetermined minimum altitude;
a second signal detector circuit operatively connected to said third summing means for generating a command warning signal when the output of said third summing means exceeds a second predetermined value;
a second gate means operatively connected to said second detector circuit for inhibiting said command warning signal above a predetermined altitude.

10. The warning system of claim 9 additionally including a limiter circuit operatively connected between said first summing means and said scaling amplifier to limit said biased altitude signal.

11. The warning system of claim 10 wherein the output of said first gate is operatively connected to said second gate to inhibit said command warning signal whenever said advisory warning signal is inhibited.

12. The warning system of claim 11 wherein said first gate is operatively connected to a signal source representing the aircraft's flight configuration for inhibiting said advisory warning when the aircraft is in a predetermined flight configuration.

13. An aircraft warning instrument for alerting the pilot of an aircraft of excessive descent below a radio glide slope beam during a landing approach, comprising:
a source of signal representing the altitude of the aircraft above the ground;
a source of bias signal representing a selected altitude;
a first summing circuit for adding the altitude signal to the bias signal;
a limiter connected to the output of said summing circuit for limiting the sum signal to a zero value for an altitude signal greater than said bias signal;
means for scaling connected to said limiter for scaling the limited altitude sum signal with predetermined ratio of glide slope deviation units to altitude units for altitudes below said selected altitude;
a source of signal representing the glide slope deviation signal;
a second summing circuit for adding the scaled altitude signal to the glide slope deviation signal;
a first detector circuit operatively connected to the output of said second summing circuit effective to generate an advisory warning logic signal when the output signal from the second summing circuit exceeds a predetermined value representing an excessive aircraft descent below the radio glide slope beam for a given altitude;

an indicator for providing an advisory warning;

a source of signal representing the minimum advisory altitude signal;

a first logic gate having one input operatively connected with the said first detector circuit, another input connected with the source of minimum advisory altitude signal and an output connected with the advisory warning indicator, said first logic gate acting to inhibit an output to the advisory warning indicator in the presence of an advisory logic signal when the aircraft is below the minimum advisory altitude;

a third summing circuit for adding the scaled altitude signal to the glide slope deviation signal;

a second detector circuit connected to the output of said third summing circuit effective to generate a command logic signal when the output signal of the third summing circuit exceeds another predetermined value, greater than said predetermined value of the first detector, representing an excessive descent of the aircraft below the radio glide slope beam for a given altitude;

an indicator for providing a command warning;

a source of signal representing the maximum command altitude;

a second logic gate having one input operatively connected to said second detector, another input connected to said source of maximum command altitude and an output connected with the command warning indicator, said second logic gate acting to inhibit an output to the command warning indicator in the presence of a command logic signal when the aircraft is above the maximum command altitude;

a source of signal representing an upper limiting altitude;

means for inhibiting both said advisory and command logic signals above said upper limiting altitude; and means for inhibiting said command logic signal unless the advisory logic signal is being generated.

14. The aircraft warning instrument as defined in claim 13, wherein the scaling means includes a first scaling amplifier providing said second summing circuit with a first predefined ratio of scaled altitude signal and a second scaling amplifier providing said third summing circuit with a second predefined ratio of scaled altitude signal.

15. The aircraft warning instrument of claim 13 further including:

means actuated by an operator in the aircraft and operative only below said upper limiting altitude and without a command logic signal being generated, to inhibit both said advisory and command logic signals when the operator intends to maneuver the aircraft below the glide slope sufficient to produce an advisory or command warning by the warning instrument; and means for terminating the operator actuated advisory and command warning inhibit above said upper limiting altitude.

16. An aircraft warning instrument for alerting the pilot of excessive descent below a radio glide slope beam, comprising:

a source of signal representing the angular deviation of the aircraft position from the radio glide slope beam;

means operative above and below a selected altitude and responsive to said below glide slope deviation signal in excess of a first threshold value for generating an adivsory warning signal; and means operative below said selected altitude and responsive to said below glide slope deviation signal representing a below glide slope condition in excess of a second threshold value for generating a command warning signal.

17. The aircraft warning instrument of claim 16 including:

a source of signal representing the altitude of the aircraft above the ground; and means for effectively varying the below glide slope first and second threshold values as a function of said altitude signal.

18. The aircraft warning instrument of claim 17 wherein said threshold varying means includes:

a scaling amplifier for increasing the first and second threshold values of the advisory and command warning signals respectively as the altitude signal decreases below 150 feet; and means for inhibiting said scaling amplifier above 150 feet for altitude.

19. The aircraft warning instrument of claim 16 in which said selected altitude is 300 feet above ground.

20. The aircraft warning instrument of claim 16 including means to inhibit said advisory warning signal above an upper altitude limit of 1,000 feet.

21. An aircraft warning instrument for alerting the pilot of excessive descent below a radio glide beam, comprising:

a source of signal representing the radio altitude of the aircraft above ground;

a source of signal representing the deviation of the aircraft position from the glide slope beam;

means operative below a selected altitude and above a minimum altitude and responsive to a signal representing a deviation of the aircraft below the glide slope beam in excess of a first threshold value to generate an advisory warning signal; and means operative below a predetermined altitude within said selected and minimum altitude range of the advisory warning signal and responsive to a signal representing a deviation of the aircraft below the glide slope beam in excess of a second threshold value greater than said first threshold value to generate a command warning signal.

22. The aircraft warning instrument of claim 21 in which said minimum altitude is 50 feet, said predetermined altitude is 300 feet and said selected altitude is 1,000 feet, said warning instrument further including:

means for effectively varying the below glide slope first and second threshold values as a function of said radio altitude signal causing an increase in both threshold values as aircraft altitude decreases below 150 feet; and means for maintaining the below glide slope first and second threshold values constant above 150 feet.

23. In a warning instrument for alerting the pilot of an aircraft to a condition of undesired proximity to the ground at an airport equipped with a glide slope radio beam transmitter, the warning instrument including a source of signal in the aircraft responsive to the glide slope radio beam, the signal representing the magnitude of the angular deviation of the aircraft position from the glide slope radio beam, a source of signal representing the aircraft altitude above the ground, and detector means responsive to a first angular deviation and altitude criteria to generate an advisory warning and to a second angular deviation and altitude criteria to generate a command warning, a glide slope warning inhibit circuit, comprising:

a source of inhibit signal;

means responsive to the inhibit signal for preventing generation of either said advisory warning or said command warning; and means responsive to occurrence of said command warning to prevent operation of the inhibit signal responsive means.

24. The glide slope warning inhibit circuit of claim 23 in which said inhibit signal responsive means is inoperative above an upper altitude limit.

25. The glide slope warning inhibit circuit of claim 23 in which said warning instrument includes an advisory warning detector having an output, a command warning detector having an output, an advisory warning AND gate having as an input the output of the advisory warning detector, a command warning AND gate having as an input the output of the command warning detector and the output of the advisory warning AND gate, the inhibit signal responsive means including an inhibit AND gate having as an input the inhibit signal and an inversion of the command warning signal from the command warning AND gate, to prevent operation of the inhibit signal responsive means on occurrence of the command warning and an inversion of the output of the inhibit AND gate being an input to the advisory warning AND gate to prevent generation of either warning.

26. The glide slope warning inhibit circuit of claim 25 including a bistable inhibit flip-flop, the output of the inhibit AND gate being connected with the set input of the flip-flop and the output of the flip-flop being connected with an input of the advisory warning AND gate to prevent generation of the warnings, and means providing a signal representing the altitude of the aircraft above the glide slope warning zone, connected with the reset input of said flip-flop.

* * * * *

UNITED STATES PATENT OFFICE
CERTIFICATE OF CORRECTION

Patent No. 3,947,809         Dated March 30, 1976

Inventor(s) Charles Donald Bateman

It is certified that error appears in the above-identified patent and that said Letters Patent are hereby corrected as shown below:

Column 1, line 18, delete "the prior art, specifically";

Column 5, claim 6, lines 23 and 24, delete "incresaing" and substitute --increasing--.

Signed and Sealed this

Nineteenth Day of February 1980

[SEAL]

Attest:

SIDNEY A. DIAMOND

Attesting Officer         Commissioner of Patents and Trademarks